(12) United States Patent
Woolf et al.

(10) Patent No.: US 7,974,965 B2
(45) Date of Patent: Jul. 5, 2011

(54) FEDERATED PAGINATION MANAGEMENT

(75) Inventors: Olena Woolf, Toronto (CA); Joseph Kin Wing Tsang, Scarborough (CA); Zahid Naeem, Mississauga (CA)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 11/958,117

(22) Filed: Dec. 17, 2007

(65) Prior Publication Data

US 2009/0157600 A1  Jun. 18, 2009

(51) Int. Cl.
*G06F 17/30* (2006.01)
*G06F 15/16* (2006.01)
(52) U.S. Cl. ......... 707/707; 707/764; 707/770; 707/971
(58) Field of Classification Search .................. 707/2, 3, 707/4, 5, 971, 707, 764, 770, 999.01; 709/224, 709/225
See application file for complete search history.

(56) References Cited

U.S. PATENT DOCUMENTS

| | | | |
|---|---|---|---|
| 6,014,656 A * | 1/2000 | Hallmark et al. ...................... 1/1 |
| 6,658,405 B1 * | 12/2003 | Ozbutun ............................... 1/1 |
| 6,665,684 B2 * | 12/2003 | Zait et al. .............................. 1/1 |
| 7,765,246 B2 * | 7/2010 | Basu et al. ...................... 707/825 |
| 2004/0128378 A1 * | 7/2004 | Blakley et al. ................. 709/224 |
| 2004/0249939 A1 * | 12/2004 | Amini et al. ................... 709/225 |
| 2005/0050050 A1 * | 3/2005 | Kawamura ..................... 707/100 |
| 2005/0102271 A1 * | 5/2005 | Robertson ......................... 707/2 |
| 2007/0038931 A1 * | 2/2007 | Allaire et al. ................. 715/526 |
| 2007/0067274 A1 * | 3/2007 | Han et al. ........................... 707/4 |
| 2007/0113031 A1 * | 5/2007 | Brown et al. ................. 711/160 |
| 2007/0203893 A1 * | 8/2007 | Krinsky et al. .................... 707/3 |
| 2007/0226186 A1 * | 9/2007 | Ewen et al. ....................... 707/3 |
| 2007/0260621 A1 * | 11/2007 | Smolen et al. ................ 707/100 |
| 2007/0271211 A1 * | 11/2007 | Butcher et al. .................... 707/1 |
| 2008/0016232 A1 * | 1/2008 | Yared et al. .................... 709/229 |
| 2008/0021866 A1 * | 1/2008 | Hinton et al. ...................... 707/2 |
| 2008/0069124 A1 * | 3/2008 | Patrick ........................... 370/401 |
| 2008/0077570 A1 * | 3/2008 | Tang et al. ......................... 707/5 |
| 2008/0086524 A1 * | 4/2008 | Afergan et al. ................ 709/202 |
| 2008/0086564 A1 * | 4/2008 | Putman et al. ................ 709/227 |
| 2008/0189243 A1 * | 8/2008 | Li et al. ............................. 707/2 |

* cited by examiner

*Primary Examiner* — Greta L Robinson
*Assistant Examiner* — Dennis Truong
(74) *Attorney, Agent, or Firm* — Patterson & Sheridan, LLP (57) ABSTRACT

A method of processing a plurality of instances in a federated deployment of SOA applications can include the steps of receiving a transaction request to retrieve data, the request specifying retrieving the data stored according to range of indices of the federated deployment, processing each of the instances in a predetermined order to retrieve the data; and calculating a total number of records in the federated deployment.

12 Claims, 7 Drawing Sheets

FEDERATED PAGINATION MANAGEMENT

FIELD OF THE INVENTION

The present invention is related to the field of Service Oriented Architecture applications, and more particularly, to managing federated deployments of SOA applications.

BACKGROUND

In a typical Service Oriented Architecture (SOA) environment, multiple individual nodes or application instances can be combined to form a federation of resources that can be accessed from any service node. For example, in the case of federated deployments, the associated nodes or instances of an application can be used as a single virtual application, which allows data stored in any instance to be searched from any node in the SOA environment using a federated service request. In general, federated service requests search across all the instances in the federated deployment (including local instance) and return a combined result.

The response from a federated search (i.e., a federated search transaction) typically contains the results from the multiple instances. Each of the instances generally provides pagination of the data within that instance if a user requests data within certain range. However, when this range is submitted to multiple instances, the combined result typically contains significantly more data than the user expected. In general, since each of the instances could have some data in the requested range, the combined result can potentially have the size of requested range multiplied by the total number of federated instances. To reduce the size of the combined result provided to the user, the combined result is typically cached and only a limited range of the cached data is provided to the user. However, such an approach generally requires application to maintain the user session and requires significant system resources to be able to cache combined results generated for all concurrent users. Accordingly, such an approach typically requires the use of virtual memory techniques to support concurrent users, generally resulting in reduced performance and increased delays.

Another approach can be to utilize a SQL query instead of a federated service request and to limit the number of records returned from the query. In a SQL query, the queries are sent directly to the multiple remote databases instead of sending requests to remote application instances that are part of federated deployment. As a result, SQL queries are generally unacceptable for SOA operations, as SQL queries bypass the services layer of the application instances, missing out on valuable business logic that service layer provides.

Therefore, what is needed is a system and method for managing federated deployments of SOA environment using federated service requests to limit the amount of data retrieved.

SUMMARY

In a first embodiment of the present invention, a method of processing a plurality of instances in a federated deployment is provided. The method can include receiving a transaction request to retrieve data, where the request specifies retrieving the data stored according to a range of indices of the federated deployment. The method can also include processing each of the instances in a predetermined order to retrieve the data and calculating a total number of records in the federated deployment.

In a second embodiment of the present invention, a system for managing data is provided. The system can include a processing element and a plurality of storage elements, the storage elements comprising instances of a federated deployment. The processing element can be configured to receive a transaction request to retrieve data according to a range of indices of the federated deployment, to retrieve data from the federated deployment, process each of the instances in a predetermined order to retrieve the data, and calculate a total number of records in the federated deployment.

In a third embodiment of the present invention, a computer-readable storage, having stored thereon a computer program for searching a plurality of instances in a federated deployment is provided. The computer program can comprise a plurality of code sections executable by a computer for causing the computer to perform the steps of: receiving a transaction request to retrieve data, processing each of the instances in a predetermined order to retrieve the data, and calculating a total number of records in the federated instance. In the computer-readable storage, the received transaction request can specify retrieving the data stored according to range of indices of the federated deployment.

DETAILED DESCRIPTION OF THE DRAWINGS

Embodiments of the present invention provide systems and methods for utilizing federated service requests to query the instances in a federated deployment to bring back only data in a requested range. In the various embodiments, the caching occurring in response to a conventional transaction request can be eliminated by instead using several federated service requests to target the portions of the instances from which the requested data is to be retrieved. Therefore, not only can the amount of data to be included in a combined result be reduced, but the need for storing large numbers of results, using caching or virtual memory techniques, is also eliminated.

One aspect of the present invention provides for using a combination of general and targeted transactions for retrieving data from the various instances of a federated deployment in response to a user transaction request. For example, in one embodiment, in response to a user transaction request, a general or "probe" transaction can be forwarded to each of the instances. The probe transaction can be configured to recover the number of records in each instance. The probe transaction can also include a request to search for the requested data using a range of specified in the user transaction request. In the case that data in the requested range is found in an instance, the data can be retrieved from the instance and can be added to a response to be presented to the user.

Although the probe transaction forwarded to the instances can result in a response that contains all of the requested data, a targeted transaction can be required for some of the instances to obtain a response that contains requested data. Therefore, if at least a portion of requested data is located within an instance, but for some reason the range specified in the probe request fails to provide a response with the correct data or if data is missing, embodiments of the present invention provide for creating a targeted transaction for retrieving the data from the instance. Specifically, the targeted transaction can be generated by determining a new range for the targeted transaction request. In the various embodiments, the need for targeted transaction requests can vary depending on the distribution of data in the various instances of the federated deployment and the range specified in the transaction request.

In the various embodiments, different types of instances can be managed differently or in a specific order. For example, an additional processing step can be provided for a local instance when the instance is not part of the concurrent probe transaction request. In such embodiments, the local instance can be used as the first instance. Similarly, particular remote instances can be managed differently from other remote instances.

In some embodiments, the total number of records in all instances in the federated deployment can be required as part of the response to the user request. For example, when presenting paginated data to the user, the total number of records can also be presented to the user to indicate to the user the total number of records and/or pages of records not currently presented. In such embodiments, even after all data in the specified range is found in a first portion of the federated instances, the remaining instances can be analyzed to determine the total number of records in the federated deployment.

Figure 1:
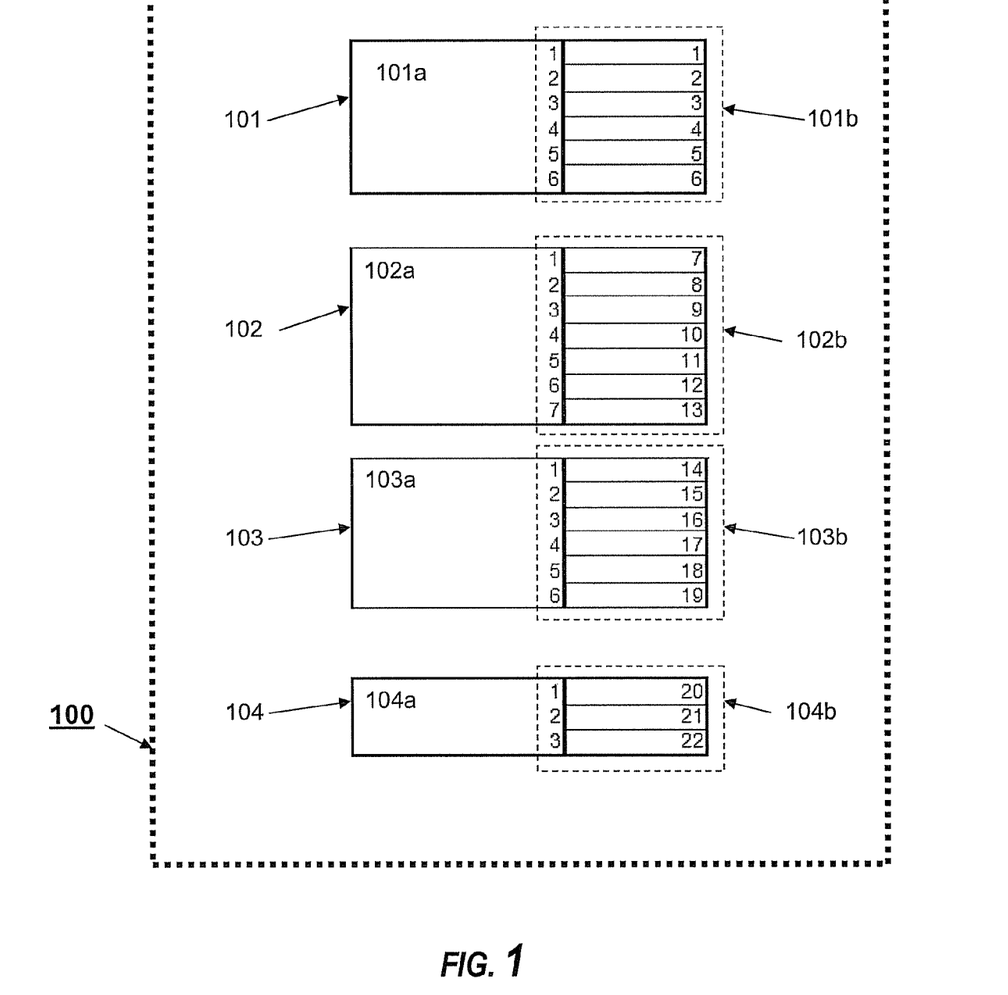
FIG. 1 is a schematic view of an exemplary federated deployment for use with an embodiment of the present invention.

FIG. 1 depicts a schematic representation of a federated deployment 100 for use with an embodiment of the present invention. In the various embodiments, the deployment 100 can include multiple instances 101-104 of an application, where each of the instances 101-104 can include an application portion 101a-104a for receiving the requests and a data portion 101b-104b. A data portion 101b-104b can include any number of records. Although only 4 instances are shown in FIG. 1, it is within the scope of the present invention to include any number of instances in a federated deployment.

To the user, the multiple instances 101-104 operate can operate as a single virtual application containing a single virtual database. Therefore, as shown in FIG. 1, when the data portions 101a-104b are used to store a total of 22 values, the user can refer to these values using indices 1-22 associated with the virtual database instead of the individual indices of each of the individual instances 101-104.

Accordingly a user searching the federated deployment for data in accordance with an embodiment of the present invention, needs only to specify only the range within virtual index values 1-22 to search. For example, if a request specifies that values in virtual index range of 4-12 are to be retrieved, embodiments of the present invention provide for searching, in order, through instances 101-104 until all values matching the range are found. That is, instance 101 would be searched first and would provide virtual index values 4-6. Next instance 102 would be searched and would provide virtual index values 7-12. No other values would be retrieved from instances 103 and 104, since all values have already been found. However the total number of records in each of the instances 101-104 can be determined by analyzing subsequent instances.

In the various embodiments, instances can be processed in the same order for each transaction request received from a user. This can ensure consistency of the data in the response to the user between different transaction requests assuming underlying data does not change. For example, when a user having the first ten records requests the next ten records, by processing the instances in the same order, the user would be assured to not receive duplicate data, as processing the instances in the same order each time results in essentially retrieving data from the instances from where the previously present data left off. Even though this means that a complete search of the instances needs to be completed in response to each transaction request, the amount of cache or virtual memory needed is limited or eliminated since the only data actually retrieved is that in the range, not all the data stored in all the instances.

For example, referring back to the previous example in FIG. 1, a subsequent request can include a request for data in the range of 13-21. As before, the embodiments of the present invention provide for searching, in order, through instances 101-104 until all values matching the range are found. That is, instance 101 would be searched first, but would provide no values. Next, instance 102 would be searched and would provide virtual indexed value 13. Afterwards, instance 103 would be searched and would provide virtual indexed values 14-19. Finally, instance 104 would be searched and would provide virtual indexed values 20-21. As previously described, the total number of records in each of the instances 101-104 would also be determined. Accordingly, because the instances are searched in the same order each time, the values are retrieved in a consistent manner, reducing or eliminating the likelihood of duplicate values being presented.

Accordingly, in the various embodiments, the order of the instances in the federated deployment can be sorted prior to any transaction request. In some embodiments, a sorting key or other ordering criteria can be provided to determine the order for the instances. In other embodiments, instances can be initially accessed in a random order and this order can be stored at a known location. For example, the order can be stored at the node making the request for data. Therefore, using a fixed sorting key or other fixed order for searches, the virtual database being searched is essentially always in the same order. Consequently, multiple transaction requests are consistently handled by accessing the data in the same order. Although the order can be stored as information in a user session, this can require additional resources to configure the session. Alternatively, using a pre-determined order for all users eliminates the need for session information and makes the searches stateless. Accordingly, the searches can occur without the need for knowledge of the particular user.

Figure 2A:
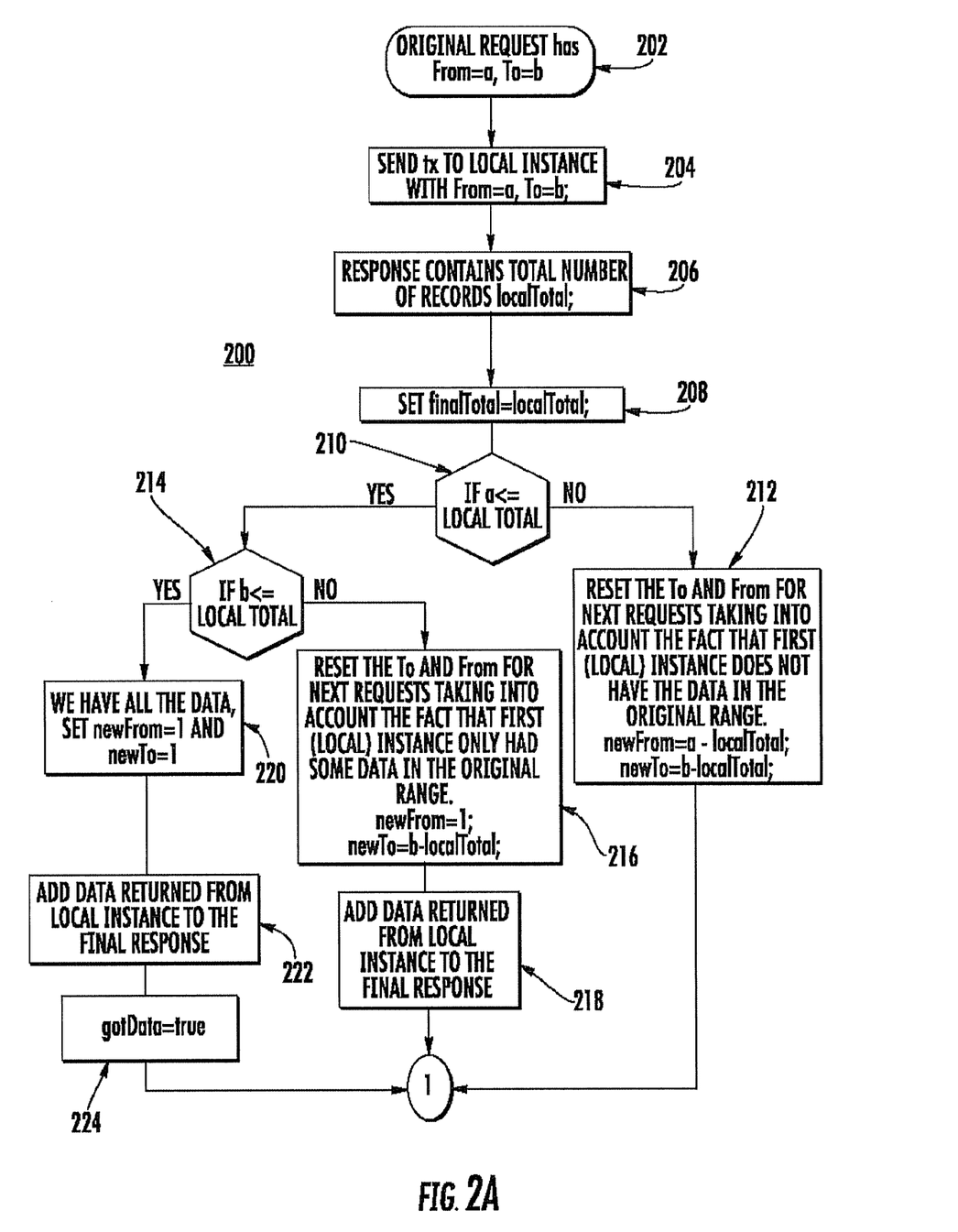
FIG. 2A-2D depict a flowchart of exemplary steps of a method for managing a federated deployment according to an embodiment of the present invention.

FIGS. 2A-2D depict an exemplary embodiment of a method 200 for responding to user transaction requests using federated service requests according to an embodiment of the present invention. The method 200 can begin with the receipt of the transaction request in step 202. As previously discussed, a transaction request can specify recovery of data from a specific range of indices of the federated or virtual database. For example, as shown in FIG. 2A, the request can specify recovery of data in from indices a to b of the virtual database.

As previously described, the local instance can be the first instance used for storing values and can be managed separately from the remote instances. In such embodiments, after the request is received in step 202, a probe transaction (tx) for the local instance can be generated and transmitted to the local instance in step 204. The probe transaction for the local instance can include a range of indices for the data request by specifying variables From and To in the user request. For example, as shown in FIG. 2A, these variables are set to a and b, respectively, the range of indices specified in the transaction request. In response to the local probe transaction, the local instance can provide a total number of records in the local instance (localTotal) in step 206. Furthermore, in embodiments where a total count of records in all instances needs to be determined, an initial value for the total (finalTotal) can be determined by initializing it to the local record count (finalTotal=localTotal) in step 208.

Once the total number of records in the local instance is determined, the method 200 can determine whether data needs to be recovered from other instances to fulfill the transaction request. In the various embodiments, such a determination can be based on a comparison of the specified index range values (a and b) to the number of records in the local instance (localTotal). That is, if the either of the index range values is greater than the number of records in the local instance, the requested data is not located within the local instance since no data with indices in the specified range values could exist in the local instance. For example, referring to FIG. 1, assume that the first instance 101 is a local instance and that a and b specify virtual index values of 2 and 5, respectively. In such a case, no additional instances need to be accessed for data, as the first instance contains data for indices 2-5. However, in the case of incomplete or missing data in the local instance, other remote instances would need to be searched to retrieve the complete set of data for the transaction request. For example, if a and b specify virtual index values of 2 and 15, only some of these indices (2-6) are located in the first instance 101. In another example, if a and b specify virtual index values of 12 and 15, none of these indices would be located in the first instance 101.

Referring back to FIG. 2A, the method 200 can first determine if the lower index range value specified in the request (From =a) is less than or equal to the number of records in the local instance (localTotal) in step 210. If a is greater than localTotal in step 210, this indicates that none of the indexed values requested have been stored in the local instance. Using this information, the index range values for subsequent remote transactions can be reset or modified in step 212 to take into account that the local instance includes no data in the specified range and to specify the index value to begin looking for data in the subsequent instances. For example, as shown in FIG. 2A, the values for the new index range values for the subsequent instances, newFrom and newTo, can be set to a-localTotal and b-localTotal, respectively. Referring to example above where the index range values were 12 and 15, this would result in new index range values of 6 and 9, respectively, for searching in the second instance 102. As shown in FIG. 1, an index of 6 in the second instance 102 is associated with a virtual index value of 12 for the virtual database, the index specified in the transaction request.

Referring back to FIG. 2A, if a is less than or equal to localTotal in step 210, then the local instance includes at least a portion of the data requested, depending on the upper index range value specified in the request (b). Therefore, a second comparison in step 214 can be used to determine whether or not the any of the data requested is missing from the local instance by comparing b to the localTotal. If b is greater than localTotal in step 214, then only a portion of the requested data is stored in the local instance. As in step 212, the index range values for subsequently searching within the remote instances can be modified in step 216 to specify the first index value in the remote instances to be searched. In particular, as shown in FIG. 2A, the values for the new index range values, newFrom and newTo can be set to 1 and b-localTotal, respectively. Therefore, in the remote instances, it is expected that the first missing values is stored in a first indexed location within one of the remote instances. Referring to example above where the range is 2 to 15, this would result in values of 1 and 9, respectively, for searching in the second instance 102. As shown in FIG. 1, an index of 1 in the second instance 102 is associated with a virtual index value of 7 for the virtual database, the first value missing from the local instance. Referring back to FIG. 2A, after the range is reset or modified, the values that are within the local instance can be included in the combined result being generated in step 218.

If b is less than or equal to localTotal in step 214, then all requested data is stored within the local instance. Accordingly, all data can be retrieved from the local instance. Therefore, the range for searching within subsequent remote instances can be set to a default value in step 220. In FIG. 2A, the range is set from 1 to 1, however, since all values have been found, the value for the new range is irrelevant and any values can be used in the various embodiments. After the default values have been entered in step 220, the data in the local instance can be included in the combined result being generated in step 222. Furthermore, in step 224, a flag (gotData) can be set to indicate further that no other data needs to be retrieved from the remote instances. However, the invention is not limited in this regard and other method for indicating that the requested data has been retrieved can also be used. For example, the total number of data values retrieved can be compared to the total number requested.

Figure 2B:
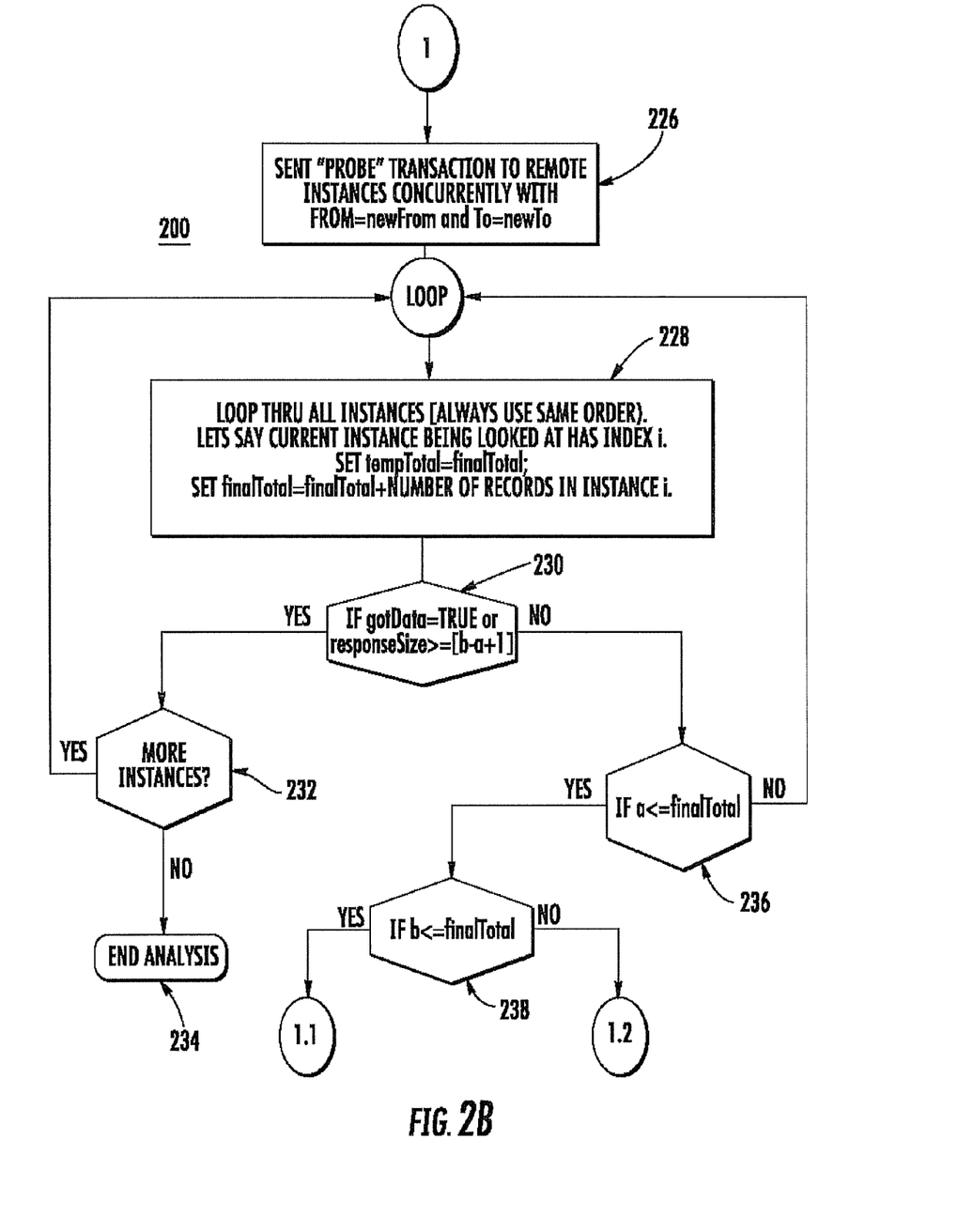

Regardless of whether data is present in the local instance or if a local instance even exists, method 200 can require examination of the remote instances to determine at the very least, the total number of records in a federated deployment. Therefore, as shown in FIG. 2B, method 200 can continue by first concurrently sending a remote probe transaction to all remote instances in step 226. The remote probe transaction, like the local probe transaction, can specify a range of indices for searching for values. In the case where a local instance exists, the range of indices is specified in one of steps 212, 216, or 220, depending on the amount of data stored in the local instance. However, in the case where no local instance is present, the range of indices can be set to that specified in the transaction requested received in step 202 (a and b).

Once the range of indices is specified for the remote instances in step 226, method 200 provides for looping through all the remote instances to determine the number of records in each remote instance in step 228. Additionally, the method 200 can also maintain one or more running counts of the total number of records from all instances previously and/or currently being analyzed in step 228. For example, as shown in FIG. 2B, the number of records from previously analyzed remote instances and/or local instances can be stored (by setting tempTotal=finalTotal) and a new total count can also be stored (by incrementing finalTotal by the number of records in the current instance).

Once the total running number of record counts have been updated based on the current instance, the method 200 can determine whether the instance needs to be searched for data. In step 230, the method 200 can determine whether the gotData flag has been set to indicate all data has been retrieved or whether the amount of data retrieved (responseSize) matches the amount of data requested. If either condition is true, no additional data needs to be retrieved. However, in embodiments where a total record count for the federated deployment is needed, the method 200 can determine in step 232 whether additional instances need to be analyzed. If no unanalyzed instances remain in step 232, the method 200 can end at step 234. If instances do remain, the method 200 can continue analyzing the remaining instances by repeating step 228 and subsequent steps.

If the neither of the conditions in step 230 is true, then the method 200 can attempt to retrieve data from the current instance. First, in step 236, the method 200 can compare the total number of previous and current records (finalTotal) to the lower range value specified in the transaction request (a), similar to the comparison in step 210. If a is greater than finalTotal, this indicates that the current instance cannot include any data having associated with any of the range of indices specified in the user transaction request. Accordingly, the values requested are likely located in one of the subsequent instances. Therefore, steps and 228 and 230 can be repeated until the total count of records is equal to or exceeds a, indicating that data associated with at least index value a is stored in the current instance. Once such a condition exists in step 236, the method can also determine whether all the remaining values to be retrieved are also stored within the current instance.

In step 238, the method can compare the upper index range value specified in the transaction request (b) to the current number of records to determine whether a sufficient number of records have been found such that a the current instance contains data associated with an virtual database index value of b, similar to the comparison in step 214. Accordingly, the method 200 can compare the total number of previous and current records (finalTotal) to b in step 238. If the condition is true in step 238, this indicates that the data that still needs to be retrieved is completely stored within the current instance.

Figure 2C:
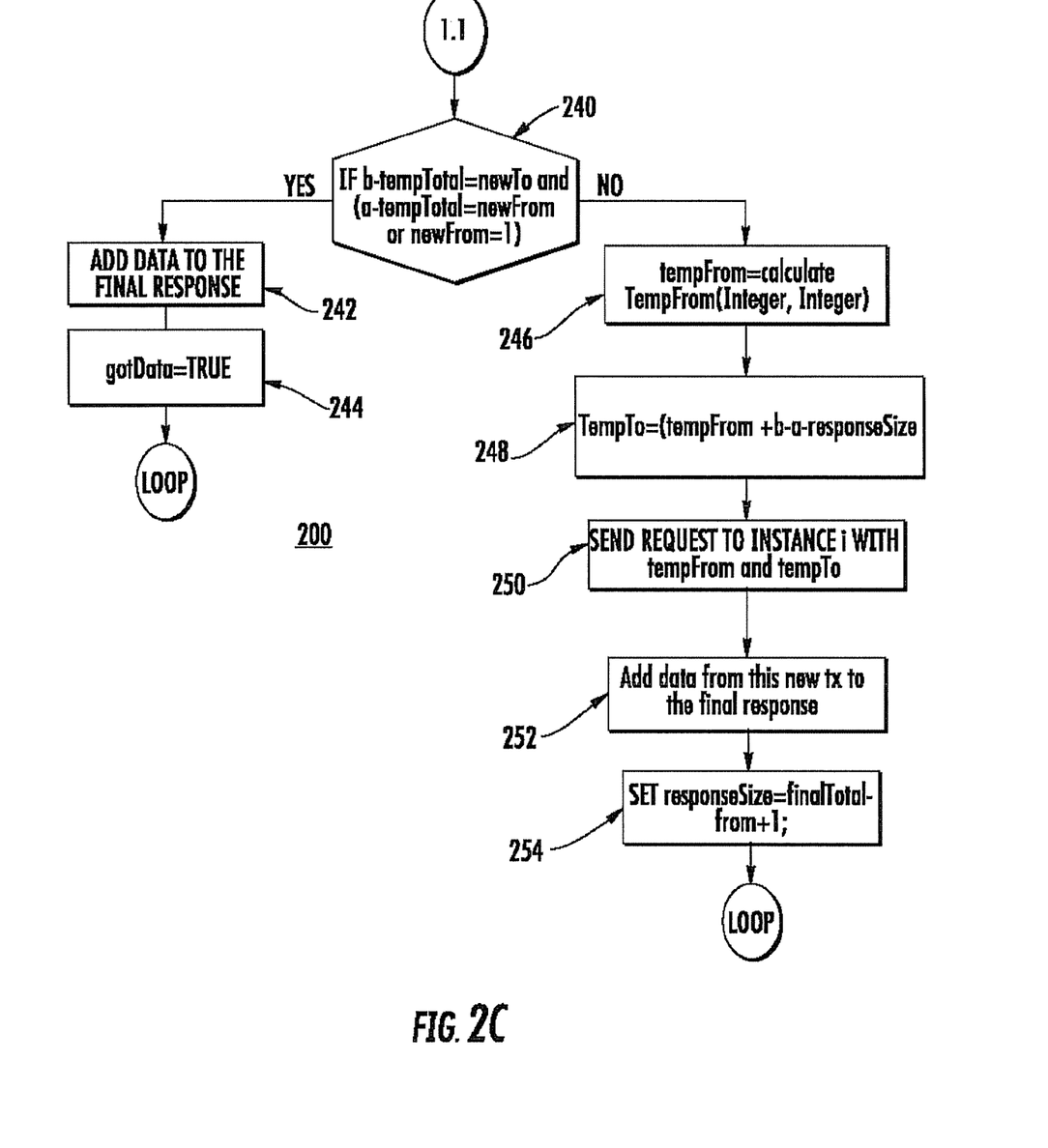

When the condition is true in step 238, the method 200 can first determine whether correct range is specified for retrieving the values from the current instance in step 240. That is, even though the number of records would encompass data associated with at least one of the range values, the range values cannot be used to properly retrieve data from the current instance. Therefore, the method 200 can determine whether data can be directly retrieved using the range of index values in the remote probe transaction request (newTo and newFrom). In step 240, the method 200 can determine that data matches if the number of remaining records to be retrieved is equal to the number of records being retrieved from the current instance and the data can be directly retrieved from the current instance. For example, as shown in FIG. 2C, the method can compare b-tempTotal and a-tempTotal to newTo and newFrom, respectively in step 240. If both comparisons are true, then it is assumed that the data is correctly indexed and can be directly retrieved. Alternatively, if newFrom is equal to 1 and b-tempTotal and newTo match, indicating data beginning at the start of the instance, the comparison in step 240 is also held true and the index range values specified in the probe transaction request can be used to retrieve the data. Consequently, the data can be retrieved in step 242 and the gotData flag can be set in step 244 to indicate all requested data has been retrieved. Afterwards, the next instance can be analyzed starting with step 228, as previously discussed.

Figure 3:
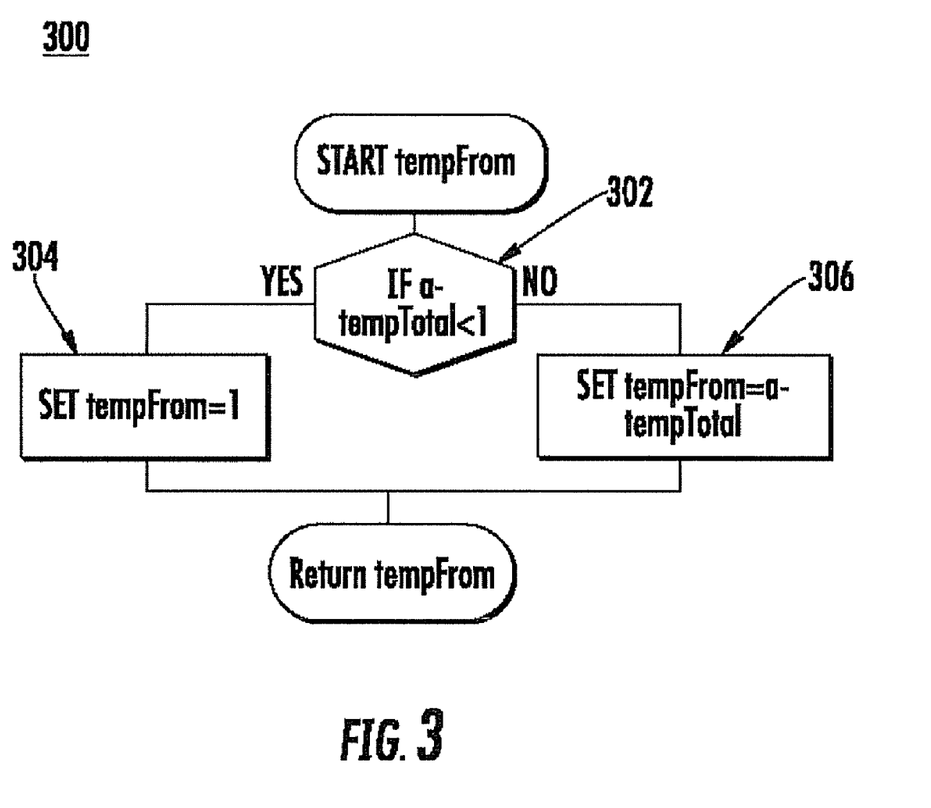
FIG. 3 depicts a flowchart of exemplary steps of a method for determining targeted ranges for managing an instance of a federated deployment according to an embodiment of the present invention.

When the condition is false in step 240, this indicates that the data cannot be directly retrieved using the index range values, as the data in the instance is incomplete or otherwise does not match the range of index values in the probe transaction request. In such cases, the correct ranges can be recalculated in steps 246 and 248 by determining new index range values, tempFrom and tempTo. The value for tempFrom can be calculated according to the exemplary method 300 in FIG. 3. In FIG. 3, the method 300 begins in step 302 by first determining whether the number of records from previous instances (tempTotal) exceeds the lower limit range (a) by at least 1. If the condition is true, then the tempFrom is set to 1 in step 304, otherwise, tempFrom is set to the difference between a and tempTotal in step 306. In either case, the lower limit for the retrieving data from the current instance is shifted.

Referring back to FIG. 2C, once the tempFrom value is calculated in step 246, the value can be used in step 248 to calculate the new upper index range value tempTo. A value for tempTo can be calculated from the sum of tempFrom and the number of data entries yet to be retrieved (b-a-responseSize), maintaining the correct range of values to search for. Afterwards, in step 250, a targeted transaction request can be sent again to the current instance, specifying the new range of indices (tempFrom and tempTo). The data received from this request can then be stored in the combined final response in step 252. However, because the targeted transaction only occurs when a problem with the data exists, the gotData flag is not set, as other data may yet still need to be retrieved. Instead, the total number of records in the combined response can be incremented in step 254 (by setting responseSize=finalTotal-a+1). The next instance can be analyzed, starting with step 228, as previously discussed.

Figure 2D:
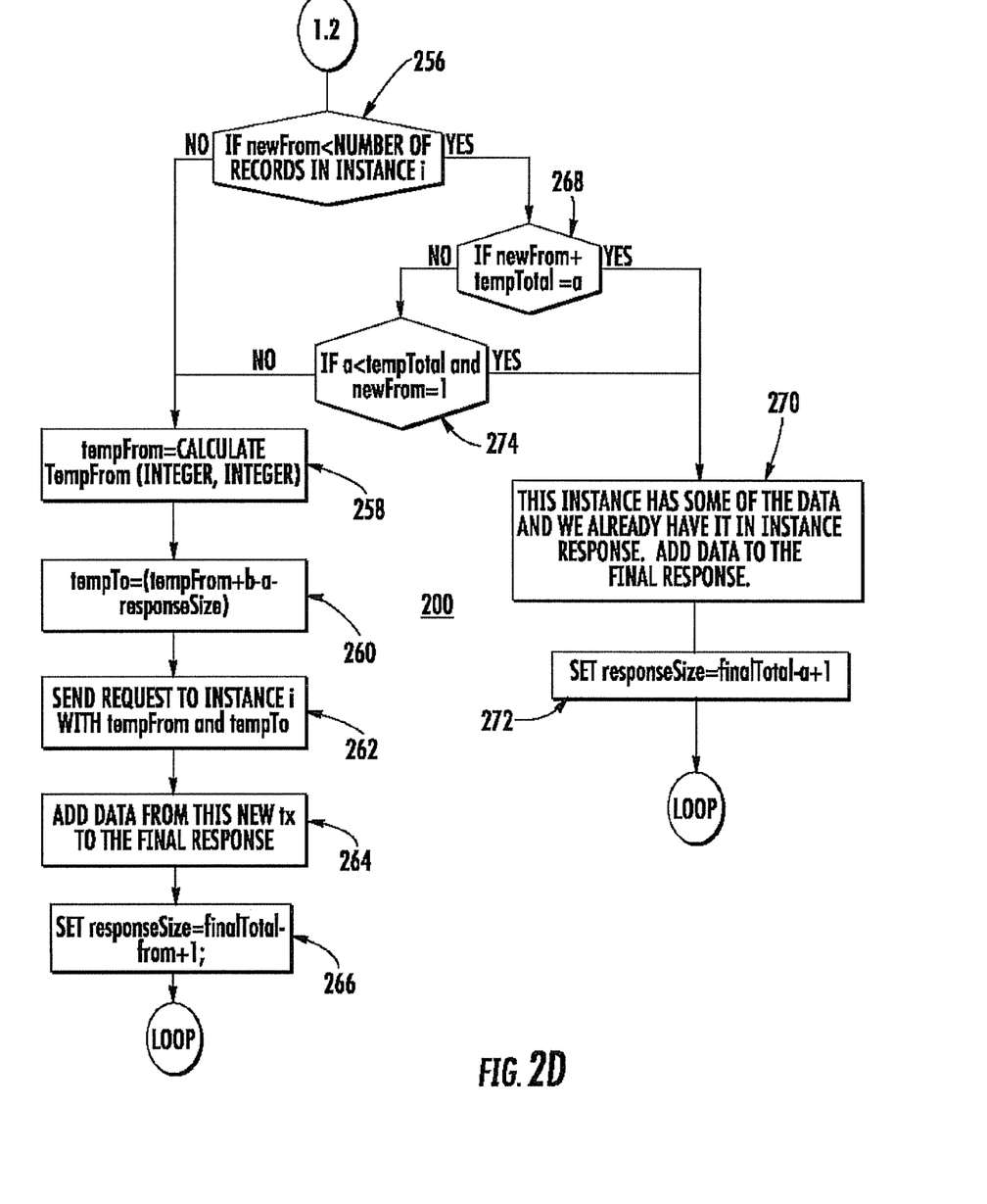

As previously discussed, a true condition in step 238 indicated that the current instance contained all the remaining values. However, a false condition in step 238 conversely indicates that at least a portion of the remaining data is stored in yet another subsequent instance. Therefore, in such cases, the method 200 can first confirm that the current index values to use for the current instance are within the indices specified in the current instance. For example, as shown in FIG. 2D, the lower index range value limit in the probe request (newFrom) can be compared in step 256 to the number of records in the current instance to confirm that data associated with the lower index range value is included in the current instance. If the condition in step 256 is false, this indicates that using the current limits does not allow the retrieval of any data and the index range values for the current instance need to be recalculated. Therefore the targeted transaction request can be generated and data can be retrieved using this new request in steps 258-264. The same process used in steps 246 and 248 can be used for determining the new limits in step 258 and 260. After retrieving the data in step 264, based on the targeted transaction sent to the current instance in step 262, the total number of records in the combined response can then incremented in step 262, as previously discussed for step 254. The next instance can then be analyzed, starting with step 228, also as previously discussed.

In contrast, if the condition in step 256 is true, this indicates that the current limits allow for the retrieval of at least some data from the current instance. To verify that no other modification of current limits are needed for the current instance, the method 200 can confirm that the lower index range value is correct. First, in step 268, the method 200 can compare the sum of the current index with the running number of records in the previous instances to the specified lower limit. If the condition is true in step 268, this indicates the lower limit is corrected specified. Accordingly, the data within the current instance, starting at the current lower limit can be retrieved and stored in step 270. Afterwards, The total number of records in the combined response can then incremented in step 272, as previously discussed for steps 254 and 262. The next instance can then be analyzed, starting with step 228, also as previously discussed.

However, if the condition in step 268 is false, the method 200 needs to make a further determination in step 274 any values retrieved using the range of index values in the probe request will not connect retrieve data. In such cases, method 200 can require a targeted transaction request using a recalculated of the range of indices for the current instance. However, no such recalculation is needed unless the lower index range value specifies to start with a first value in the instance (newFrom=1) and the running total of records in previous instances (tempTotal) exceeds the specified lower limit (a). If this condition is true in step 274, the range of indices from the probe transaction request are used, since this indicates that the data is stored in all available entries in the instance, and steps 270 and 272 can be performed using the range of indices from the probe transaction request. Afterwards, the next instance can then be analyzed, starting with step 228, as previously discussed. However, if the condition in step 274 is false, then new indices need to be recalculated and steps 258-266 can be performed. Afterwards, the next instance can be analyzed, starting with step 228, as previously discussed.

Upon reviewing the aforementioned embodiments, it would be evident to one of ordinary skill in the art that the embodiments can be modified, reduced, or enhanced without departing from the scope and spirit of the claims described below. In some embodiments, a search for data can include not only a request for retrieval of a specific range of indicies in the instances, but for specific values in the instances. For example, a transaction request can specify to locate all data matching "Smith" in the instances. In such cases, the data retrieved is that matching "Smith". Furthermore, a total record count for records matching "Smith" can also be provided alternatively or in combination with the total record counts for the instances.

Figure 4:
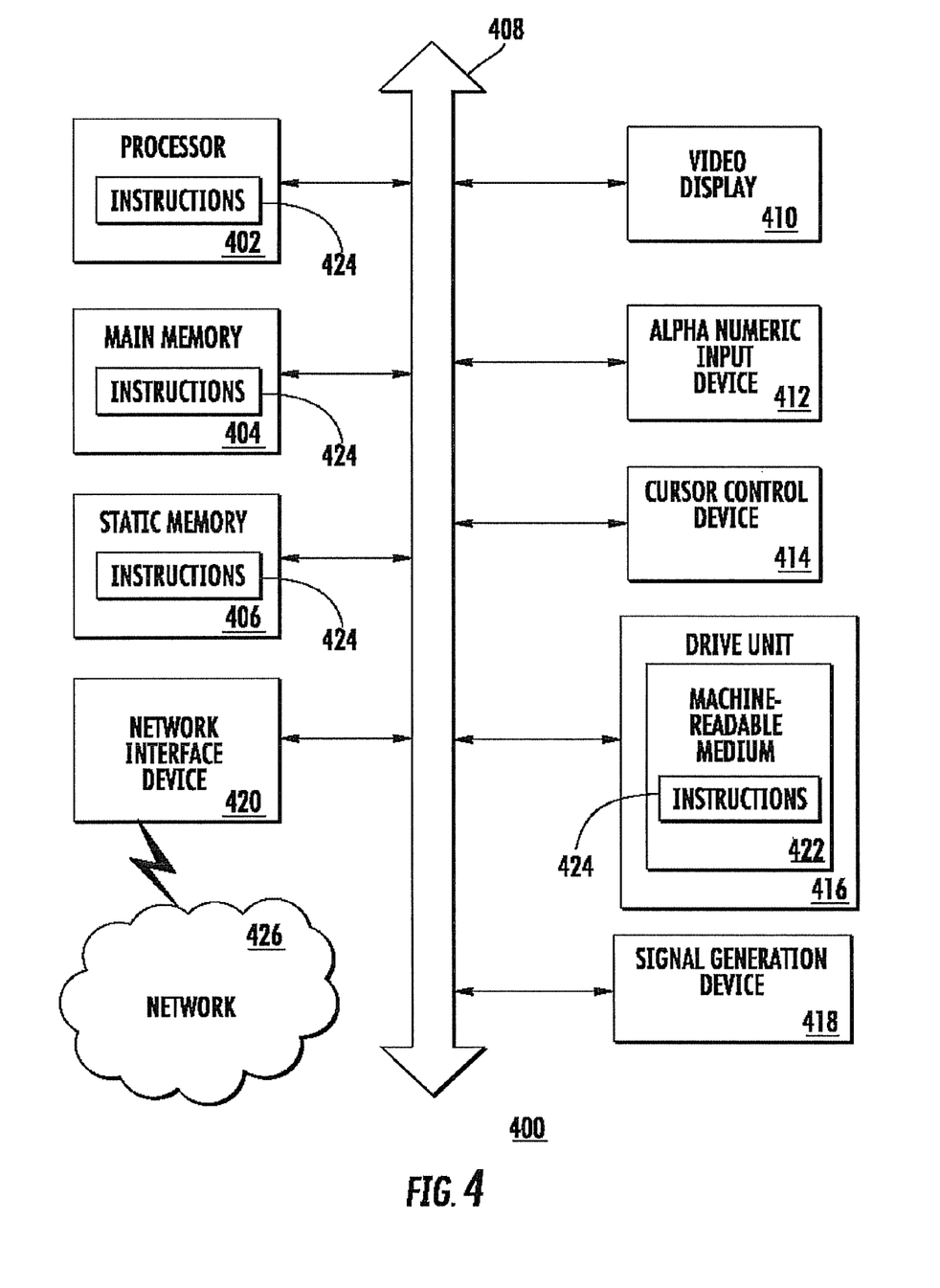
FIG. 4 is a schematic view of a computer system within which a set of instructions operate according to an embodiment of the present invention.

FIG. 4 is a schematic diagram of a computer system 400 for executing a set of instructions that, when executed, can cause the computer system to perform one or more of the methodologies and procedures described above. In some embodiments, the computer system 400 operates as a standalone device. In other embodiments, the computer system 400 can be connected (e.g., using a network) to other computing devices. In a networked deployment, the computer system 400 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 400 can include a processor 402 (such as a central processing unit (CPU), a graphics processing unit (GPU, or both), a main memory 404 and a static memory 406, which communicate with each other via a bus 408. The computer system 400 can further include a display unit 410, such as a video display (e.g., a liquid crystal display or LCD), a flat panel, a solid state display, or a cathode ray tube (CRT)). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a computer-readable storage medium 422 on which is stored one or more sets of instructions 424 (e.g., software code) configured to implement one or more of the methodologies, procedures, or functions described herein. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 424 or that receives and executes instructions 424 from a propagated signal so that a device connected to a network environment 426 can send or receive voice and/or video data, and that can communicate over the network 426 using the instructions 424. The instructions 424 can further be transmitted or received over a network 426 via the network interface device 420.

While the computer-readable storage medium 422 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of processing a plurality of instances in a federated database, the method comprising:
   receiving a first transaction request to retrieve data, the request specifying retrieving the data stored according to a range of indices of the federated database, and wherein the federated database comprises a local instance and one or more remote instances;
   processing the local instance to identify whether data responsive to the request is stored in the local instance;
   processing each of the remote instances in a predetermined order to retrieve the requested data, wherein the local instance is processed prior to the one or more remote instances, and wherein the processing includes, for each remote instance:
      comparing a total number of records in a current remote instance being processed to a lower limit and an upper limit of the range of indices,
      retrieving data from the current remote instance when the lower limit is less than the total number of records in the instances that have been processed, wherein the data is retrieved from the current remote instance using a range of indices specified by the lower limit and a lesser one of the upper limit and the total number of records in the remote instance, and
      prior to processing a subsequent remote instance identified according to the predetermined order, decrease values of the upper and lower limits when the upper limit is greater than the total number of records in the current remote instance, wherein the decreased values specify an expected range of indices associated with data in the subsequently processed remote instance; and
   calculating a total number of records in the federated database.

2. The method of claim 1, wherein the range of indices used to retrieve the data fails to retrieve at least a portion of the data, the step of processing further comprising:
   calculating a targeted range of indices for the instance; and
   retrieving the data from the instance using the targeted range of indices.

3. The method of claim 1, wherein the step of decreasing further comprises decreasing the values of the range of indices to a default value.

4. The method of claim 1, further comprising the steps of:
   receiving at least a second transaction request; and
   repeating the steps of processing and calculating for the second transaction request, wherein the predetermined order is the same for the first transaction request and the second transaction request.

5. A system for managing data, comprising
   a plurality of storage elements, the storage elements comprising instances of a federated database; and
   a processing element configured to:
      receive a first transaction request to retrieve data from the federated database, wherein the request specifies retrieving the data stored according to a range of indices for the federated database, and wherein the federated database comprises a local instance and one or more remote instances,
      process the local instance to identify whether data responsive to the request is stored in the local instance,
      process each of the remote instances in a predetermined order to retrieve the requested data, wherein the local instance is processed prior to the one or more remote instances, and wherein the processing includes, for each remote instance:
         compare a total number of records in a current remote instance being processed to a lower limit and an upper limit of the range of indices;
         retrieve data from the current remote instance when the lower limit is less than the total number of records in the instances that have been processed, wherein the data is retrieved from the instance using a range of indices specified by the lower limit and a lesser one of the upper limit and the total number of records in the remote instance; and
         prior to processing a subsequent remote instance identified according to the predetermined order, decrease values of the upper and lower limits when the upper limit is greater than the total number of records in the current remote instance, wherein the decreased values specify an expected range of indices associated with data in the subsequently processed remote instance; and
      calculate a total number of records in the federated database.

6. The system of claim 5, wherein the range of indices used to retrieve the data fails to retrieve at least a portion of the data, and wherein the processing element is further configured to:
- prior to the decreasing step, calculate a targeted range of indices for the instance; and
- retrieve the data from the instance using the targeted range of indices.

7. The system of claim 5, and wherein the step of decreasing further comprises decreasing the values of the range of indices to a default value.

8. The system of claim 5, wherein the processing element is further configured to:
- receive at least a second transaction request; and
- repeat the steps of processing and calculating for the second transaction request, wherein the predetermined order is the same for the first transaction request and the second transaction request.

9. A computer-readable storage medium, having stored thereon a computer program for searching a plurality of instances in a federated database, the computer program comprising a plurality of code sections executable by a computer for causing the computer to perform the steps of:
- receiving a first transaction request to retrieve data, the request specifying retrieving the data stored according to range of indices of the federated database, and wherein the federated database comprises a local instance and one or more remote instances;
- processing the local instance to identify whether data responsive to the request is stored in the local instance;
- processing of the remote instances in a predetermined order to retrieve the requested data, wherein the local instance is processed prior to the one or more remote instances, and wherein the processing includes, for each remote instance:
  - comparing a total number of records in a current remote instance being processed to a lower limit and an upper limit of the range of indices,
  - retrieving data from the current remote instance when the lower limit is less than the total number of records in the instances that have been processed, wherein the data is retrieved from the current remote instance using a range of indices specified by the lower limit and a lesser one of the upper limit and the total number of records in the remote instance, and
  - prior to processing a subsequent remote instance identified according to the predetermined order, decreasing values of the upper and lower limits when the upper limit is greater than the total number of records in the current remote instance, wherein the decreased values specify an expected range of indices associated with data in the subsequently processed instance; and
- calculating a total number of records in the federated database.

10. The computer-readable storage of claim 9, wherein the range of indices used to retrieve the data fails to retrieve at least a portion of the data, and further comprising code sections for:
- prior to the decreasing step, calculating a targeted range of indices for the instance; and
- retrieving the data from the instance using the targeted range of indices.

11. The computer-readable storage of claim 9, wherein the step of decreasing further comprises decreasing the values of the range of indices to a default value.

12. The computer-readable storage of claim 9, wherein the plurality of code sections further includes code sections for:
- receiving at least a second transaction request; and
- repeating the steps of processing and calculating for the second transaction request, wherein the predetermined order is the same for the first transaction request and the second transaction request.

* * * * *